United States Patent [19]
Von Gaisberg et al.

[11] Patent Number: 5,132,517
[45] Date of Patent: Jul. 21, 1992

[54] ELECTRIC GLOW ELEMENT

[75] Inventors: Alexander Von Gaisberg, Beilstein; Norbert Graeser, Frankfurt; Alfred Merkel, Neu-Isenburg, all of Fed. Rep. of Germany

[73] Assignee: Schoeller & Co., Elektrotechnische Fabrik GmbH & Co., Frankfurt, Fed. Rep. of Germany

[21] Appl. No.: 589,103

[22] Filed: Sep. 27, 1990

[30] Foreign Application Priority Data

Sep. 29, 1989 [DE] Fed. Rep. of Germany ........ 3932605

[51] Int. Cl.$^5$ .............................. H05B 3/00; F23Q 7/22
[52] U.S. Cl. ........................................ 219/270; 338/282
[58] Field of Search .............................. 219/260–270; 338/278–282

[56] References Cited

U.S. PATENT DOCUMENTS

| | | |
|---|---|---|
| 2,694,134 | 11/1954 | Youhouse . |
| 2,975,262 | 3/1961 | Scnick ................. 219/270 |
| 3,161,754 | 12/1964 | Horwitz ............... 219/270 |
| 3,238,354 | 3/1966 | Lybrook ............... 219/270 |
| 3,909,587 | 9/1975 | Mattis ................. 219/270 |
| 3,958,099 | 5/1976 | Mattis ................. 219/270 |
| 4,007,353 | 2/1977 | Horwitt ............... 219/270 |

FOREIGN PATENT DOCUMENTS

| | | |
|---|---|---|
| 2636781 | 1/1985 | Fed. Rep. of Germany . |
| 2436942 | 4/1980 | France . |
| 2457787 | 1/1981 | France ................. 219/270 |
| 359734 | 10/1931 | United Kingdom ........ 219/270 |

Primary Examiner—Anthony Bartis
Attorney, Agent, or Firm—Armstrong, Nikaido, Marmelstein, Kubovcik & Murray

[57] ABSTRACT

An electric glow element has a heating-conductor coiled band inside of a glow-coil dish, with a mechanically strong clamped connection between the coiled band and the glow-coil dish. The connection has good electrical conductivity, and is formed by a first bead in the glow-coil dish base wall and a side wall of the glow-coil dish which is concavely curved towards the inside of the dish. A second bead is formed outside of the first bead, and serves to clamp a band end of the heating-conductor coiled band firmly, fixing the heating-conductor coiled band end between the base wall and the side wall. In a second embodiment, a single bead connects the base wall and the curved side wall. The single bead extends below the plane of the base wall, and receives the second band end. The second band end extends out of the coil plane of the coil, and the glow coil is disposed in the interior of the glow coil dish and is oriented so as to have its coil plane generally parallel to the base wall.

10 Claims, 2 Drawing Sheets

 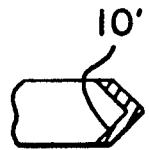 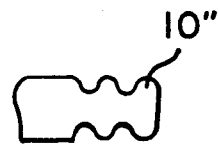
Fig.3　　　Fig.4　　　Fig.5
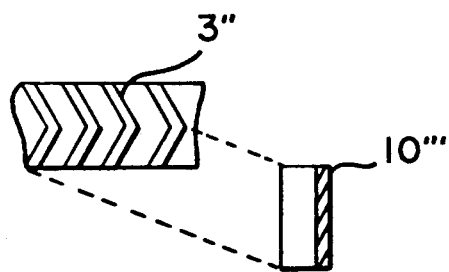
Fig.6

ELECTRIC GLOW ELEMENT

The invention an electric glow element, in particular for an electric lighter having a glow-coil dish accommodating a coiled band.

An electric glow element is known from German Pat. No. 2,636,781. In this reference, a flat metal cup accommodates a coiled winding, the coiled winding serving as a heatable glow element of a band-shaped strip which is manufactured from an electrical resistance material and which is provided with a V-shaped profile. Here, a durable mechanical fixing and a connection of good electrical conductivity of the outer end section of the heating coil to an inner surface of a metal cup serving as holder for the heating coil is created by pressing of a front face of the metal cup against the heating-coil end section protruding from the coil plane by flanging of the edge of the aperture inwards. This end section is firmly enclosed between the inner surface of the circumferential wall of the cup and its boundary edge. Since, on the one hand, only a single broad side of the end section of the heating coil is here in contact with the inner surface of the metal cup and since, on the other hand, the opposite broad side of the end section of the heating coil is to be brought into contact with the boundary edge of the metal cup, a relatively complicated flanged and crimped connection is still required for fixing the outer end section of the heating coil. Thus it is disadvantageous that, in the production of a metal cup carrying the glow element, the edges of the base wall are first of all raised by bending, i.e. are flanged, and an offset flange is then formed. Due to flanging of the boundary edge again and subsequently crimping it, it is necessary to bend the boundary edge by 360°. relative to the plane of the cup base wall. The side wall profile disclosed in the prior art is thus still relatively expensive in terms of production. Furthermore, the edge lead brought about by the 360° bending of the boundary edge is disadvantageous, particularly when the metal cup carrying the heating coil is to be of flat construction.

U.S Pat. No. 3,161,754 likewise discloses a glow element for an electric lighter, the glow element having a glow-coil dish and a heating-conductor coiled band. Here, however, the outer end 24 of the heating conductor coiled band is welded to the inner surface of the glow-coil dish side wall, which is provided with a C-shaped profile.

French Published Specification FR 2,436,942 discloses an electric glow element for an electric lighter having a heating-conductor coiled band lying wound up in a coil shape in a glow-coil dish. The heating-conductor coiled band is connected mechanically and electrically by its outer end to the glow-coil dish. The connection of the heating-conductor coiled band to the glow-coil dish cannot be discerned more precisely from this reference.

SUMMARY OF THE INVENTION

It is an object of the present invention to provide an electric glow element having a connection of an outer heating-conductor coiled band end to a dish-shaped metal cup accommodating the glow element, in which the connection is both mechanically stable and of good electrical conductivity.

The foregoing object is achieved in an advantageous manner by an electric lighter having a glow-coil dish, a glow-coil base wall, a glow-coil side wall, and a contact part, the heating coil having first and second heating-conductor coiled ends; said second heating conductor band end being shaped to extend parallel to the glow-coil base wall, and having upper and lower edges clamped between a second bead of the dish and an inner surface of the glow-coil dish side wall adjoining the second bead.

A connection of the heating-conductor coiled band end to the glow-coil dish side wall which is both mechanically strong and of good electrical conductivity can be produced in an advantageous manner by the aforementioned features of the invention. By virtue of the fact that, according to a first embodiment, a first bead is provided in the glow-coil dish base wall and the glow-coil dish side wall is at the same time bent slightly towards the inside of the dish, it is possible to achieve both a comparatively simple-to-produce bent profile of the glow-coil dish side wall and also a secure clamping, with at the same time a small electrical contact resistance of the second heating-conductor coiled band end between the glow-coil dish base wall and the glow-coil dish side wall. In this arrangement, the first bead formed guarantees that when the glow-coil dish side wall is drawn in, the second heating-conductor coiled band end lying in the recess of a second bead does not yield towards the center. The first bead formed in the glow-coil dish base wall can of course be replaced by other means having a technically equivalent effect, such as, for example, knobs, noses or elevations in the dish base wall. The second heating-conductor coiled band end can thereby be reliably positioned in the second bead, between the wall of the first bead and the glow-coil dish side wall, and secured against slipping away. In addition, a lower height of the glow-coil dish in comparison with the known prior art ca be achieved by guiding the second heating-conductor coiled band end out on the side of the dish base wall because, according to the invention, the clamping of the second heating-conductor coiled band end is effected with the aid of a glow-coil dish base wall part by means of a single curved part of the glow-coil dish side wall, whereas in the prior art, the clamping of the heating-conductor band at the broad sides of the heating-conductor band must be clamped with the aid of glow-coil dish side wall parts aligned parallel to these broad sides.

A second embodiment according to the invention of the second heating conductor coiled band end, in which the second heating conductor coiled band end is clamped between the bottom of a bead, said bottom lying below the glow-coil dish base wall, and an inner surface of the glow-coil dish base wall, advantageously ensures that, in contrast to the prior art, no space above the coiled winding of the heating-conductor band is required for the fixing of the heating-conductor coiled band end. In addition, in comparison with the first embodiment of the invention, this embodiment in particular permits a wider formation of the heating-conductor coiled band end than of the heating-conductor coiled band. This is because the curved glow-coil dish side wall gains height due to the fact that the bottom of the bead lies below the glow-coil dish base wall. With the width of the heating-conductor band end likewise broadened, the extent of the bending of the glow-coil dish side wall can then be further reduced.

According to an advantageous further development, at least one of the edges of the second heating-conductor coiled band end can be chamfered. The cutting edge formed thereby has the additional effect of providing mechanically and electrically more reliable clamping.

The wavy design of the heating-conductor coiled band end provided according to a further embodiment likewise contributes to reliable clamping.

The heating-conductor coiled band end is expediently clamped over at least half the circumference of the outer winding of the heating-conductor coiled band, this likewise improving the mechanical and electrical contact.

BRIEF DESCRIPTION OF THE DRAWINGS

The invention will be described and explained in greater detail below to the drawings, in which:

FIG. 3 schematically illustrates a coiled band having a rectangular cross section.

FIG. 4 schematically illustrates a coiled band end having a V-shaped cross section.

FIG. 5 schematically illustrates a second band end which is wavy.

FIG. 6 schematically illustrates a coiled band which has a band end which is wider than the main body portion of the coiled band.

DETAILED DESCRIPTION OF THE PREFERRED EMBODIMENT

Figure 1:
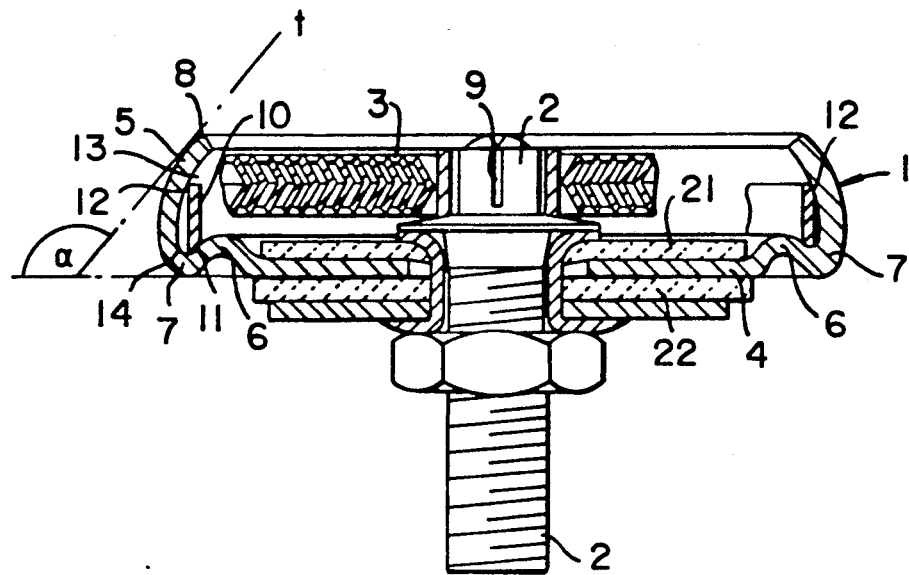
FIG. 1 shows a side sectional view through a glow element of an electric lighter having a heating-conductor coiled band end according to a first embodiment, according to the invention.

According to a first illustrative embodiment of the invention, as shown in FIG. 1, a heating-conductor coiled band 3 is fixed by a first heating-conductor coiled band end 9 on a contact part 2 extending centrally through a glow-coil dish 1. The heating-conductor coiled band 3 wound up in a coil shape is produced from a material suitable for electric resistance heating and is provided with a V-shaped profile in cross-section. The heating-conductor coiled band 3 is thereby secured against axial displacement in the direction of the axis of the contact part 2. The coil-shaped winding of the heating-conductor band 3 lies in a plane parallel to a glow-coil dish base wall 4. A first bead 6 running peripherally annularly about the glow-coil dish base wall 4 is curved convexly towards the inside of the dish is formed in the circular glow-coil dish base wall 4. A second bead 7 is likewise formed annularly around the glow-coil dish base wall 4 curved concavely towards the inside of the dish 1. A glow-coil dish side wall 5 provided with a C-shaped profile in cross-section is flanged concavely towards the inside of the glow-coil dish 1 at a location adjacent the second bead 7 extending annularly about the edge of the second bead of the glow-coil dish base wall 4. The glow-coil dish has an uppermost boundary edge 8, and the side wall 5 is only bent so far towards the inside of the glow-dish 1 that a tangent t drawn at a boundary edge 8 of the glow-coil dish side wall forms a bending angle $90° < \alpha ° 180°$, preferably $\alpha = 130°$, with the dish base wall 4. It is thereby ensured, with only a modest production expenditure required for the bending of the dish, that a second heating-conductor coiled band end 10, having an upper edge 12 and a lower edge 11, can be firmly clamped by its upper edge 12 and its lower edge 11 between an inner surface 13 of the glow-coil dish side wall 5 and a base 14 of the second bead 7. The coiled band end 10 preferably extends along over half the circumference of the glow-coil dish 1 along the glow-coil dish side wall 5. In this illustrative embodiment, the second heating-conductor coiled band end 10 is provided with a profile which is rectangular in cross-section. However, the second heating-conductor coil band end 10 can likewise be provided with a V-shaped cross-section and/or be provided with a wavy design. This results in an even firmer and more even connection between the heating conductor coiled band 3 and the glow-coil dish side wall 5. Insulators 21 and 22 insulate the glow-coil dish 1 from the contact part 2.

Figure 2:
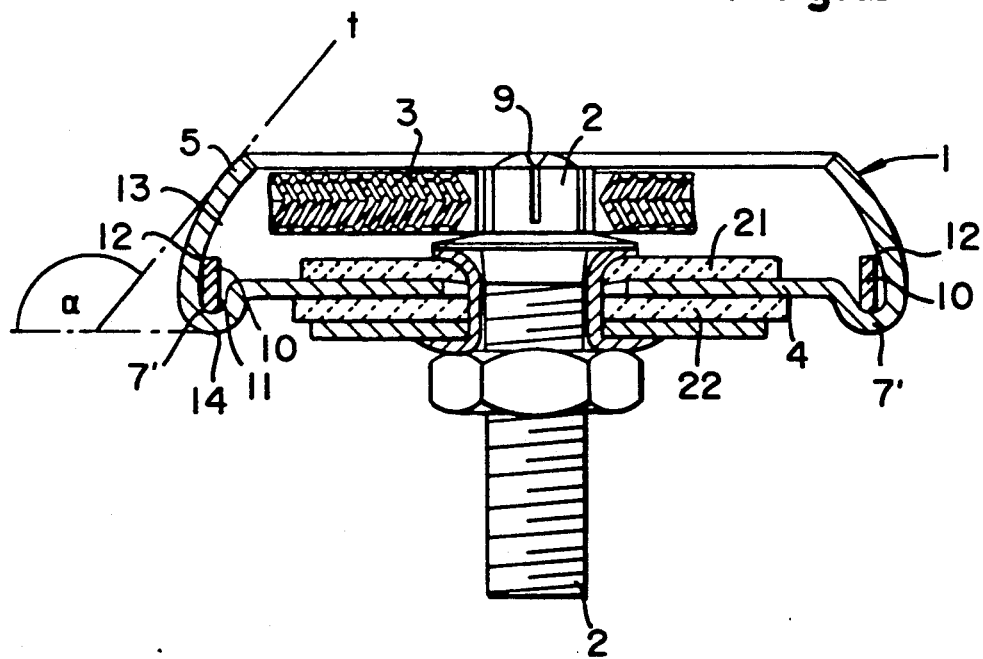
FIG. 2 shows a side sectional view through a glow element of an electric lighter having a heating-conductor coiled band end according to a second embodiment, of the invention.

According to a second illustrative embodiment of the invention, shown in FIG. 2, the fixing of the second heating-conductor coiled band end 10 differs in comparison with the first illustrative embodiment in that a bead 7' running round peripherally and curved concavely towards the inside of the glow-coil dish 1' is provided in the glow-coil dish base wall 4', the base 14 of the bead 7' thereby coming to lie below the glow-coil dish base wall 4. The glow-coil dish side wall 5, provided with a C-shaped cross-sectional outline, is likewise flanged concavely towards the inside of the glow-coil dish 1'. Insulators 21 and 22 insulate the glow-coil dish 1 from the contact part 2.

FIG. 3 schematically illustrates a coiled band 3' having a rectangular cross section. FIG. 4 schematically illustrates a coiled band end 10' having a V-shaped cross section. The coiled band end 10' in FIG. 4 is chamfered to form a cutting edge. FIG. 5 schematically illustrates a second band end 10'' which is wavy. FIG. 6 schematically illustrates a coiled band 3''' which has a band end 10''' which is wider than the main body portion of the coiled band 3'''.

While a preferred embodiment has been shown and described, it will be understood that the present invention is not limited thereto, but may be otherwise embodied within the scope of the following claims.

What is claimed is:

1. An electric glow element for an electric lighter, comprising:

and electrically conductive glow-coil dish having a base wall and side wall adjoining said base wall; said side wall including a boundary edge, and said side wall being curved concavely in a C-shape towards an interior of said dish such that a tangent of said boundary edge extends to a base wall plane containing said base wall at a bending angle $\alpha$, wherein $\alpha$ is within a range defined by $90 < \alpha < 180°$; said base wall having an annularly extending first bead and an annularly extending second bead which adjoins an exterior edge of said first bead; said first bead extending peripherally about said base wall and being curved convexly towards the interior of said dish, and said second bead extending peripherally about said first bead and being curved concavely towards the interior of said dish to form a recess;

a contact part extending centrally through said base wall of said glow-coil dish and electrically insulated therefrom;

a heating-conductor coiled band having a first band edge, a second band edge, a first band end, and a second band end, said second band being positioned in said recess of said second bead; said heating-conductor coiled band being received within said glow-coil dish in electrical contract therewith and having a coil shape, said first band end being fixed in electrical engagement with said contact part, said second band end being clamped firmly within said glow-coil dish by abutment of said first band edge against said side wall and by abutment of said second band edge in said recess of said second bead against an inner surface of said glow-coil dish side wall, said inwardly convex first bead preventing said second band edge from yielding toward the center of said dish.

2. An electric glow element according to claim 1, wherein said heating-conductor coiled band has a main body portion coiled in a coil plane which is generally parallel to said base wall plane, and wherein said second band end extends out of said coil plane, and said second band end is adjacent an outermost portion of said dish base wall.

3. An electric glow element according to claim 1, wherein said bending angle $\alpha$ is substantially equal to 135°.

4. An electric glow element according to claim 1, wherein said heating-conductor coiled band has one of a rectangular cross section and a V-shaped cross-section.

5. An electric glow element according to claim 1, wherein said second heating-conductor coiled band end has one of a rectangular cross section and a V-shaped cross section.

6. An electric glow element according to claim 1, wherein the second band end is wavy.

7. An electric glow element according to claim 1, wherein the second heating-conductor coiled band end is clamped firmly over at least half of a circumference of an outer winding of said heating-conductor coiled band.

8. An electric glow element according to claim 1, wherein said second band end is wider than said main body portion of said heating-conductor coiled band.

9. An electric glow element according to claim 1, wherein at least one of said first and second edges of said second band end is chamfered, forming a cutting edge.

10. An electric glow element for an electric lighter, comprising:

an electrically conductive glow-coil dish having a base wall and a side wall adjoining said base wall; said side wall including a boundary edge, and said side wall being curved concavely in a C-shape towards an interior of said dish such that a tangent of said boundary edge extends to a base wall plane containing said base wall at a bending angle $\alpha$, wherein $\alpha$ is within a range defined by $90° < \alpha < 180°$; said base wall having an annularly extending bead, said bead extending peripherally about said base wall and being curved concavely towards the interior of said dish to form a recess;

a contact part extending centrally through said base wall of said glow-coil dish and electrically insulated therefrom;

a heating-conductor coiled band having a first band edge, a second band edge, a first band end, and a second band end, said second band being positioned in said recess of said bead; said heating-conductor coiled band being received within said glow-coil dish in electrical contract therewith and having a coil shape, said first band end being fixed in electrical engagement with said contact part, said second band end being clamped firmly within said glow-coil dish by abutment of said first band edge against said side wall and by abutment of said second band edge in said recess of said bead against an inner surface of said glow-coil dish side wall, said bead preventing said second band edge from yielding toward the center of said dish; and said bead being disposed between said base wall and said side wall, said bead having a base lying below said base wall plane, and said second band end extending out of said coil plane generally parallel to said glow-coil dish base wall on a side of said base wall facing said interior of said dish.

* * * * *